A. ATWOOD.
Car Wheel.
No. 468.
Reissued June 9, 1857.
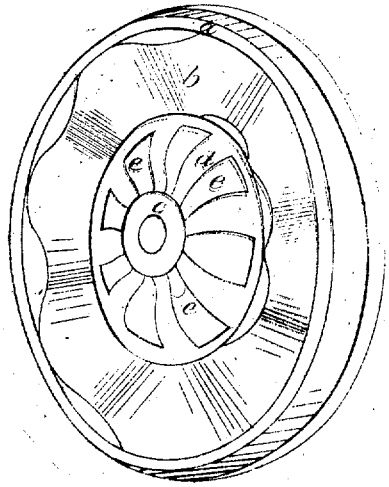
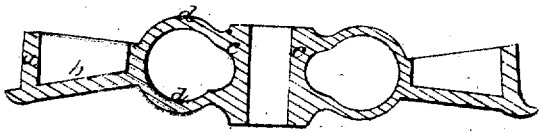

UNITED STATES PATENT OFFICE.

BEST AVAILABLE COPY

ANSON ATWOOD, OF TROY, NEW YORK.

IMPROVEMENT IN CAST-IRON CAR-WHEELS.

Specification forming part of Letters Patent No. 5,112, dated May 15, 1847; Reissue No. 468, dated June 9, 1857.

*To all whom it may concern:*

Be it known that I, ANSON ATWOOD, of Troy in the county of Rensselaer and State of New York, have invented a new and useful Improvement in Cast-Iron Wheels for Railroad-Cars; and I do hereby declare that the following is a full, clear, and exact description thereof, reference being had to the accompanying drawings and to the letters of reference marked thereon.

In cast-iron car-wheels made previously to my invention, the rim of the wheel has, in some instances, been connected with the hub by means of two plates, starting from near the ends of the hub and extending to the rim. Some important advantages have been thereby obtained. Nevertheless such a wheel is liable to a great degree of vibration and tremor from the violent concussions to which it is subjected, and besides is unnecessarily heavy and cumbersome from the disadvantageous distribution of the material of which it is composed. I have remedied these defects and made a stronger, lighter, and better wheel by making the two plates unite and terminate at about half way between the hub and the rim, (thus forming a kind of hollow ring or arch around the hub,) and extending thence to the rim a single plate.

In the accompanying drawings, Figure 3 is a perspective, and Fig. 4 a section through the axis.

C represents the solid hub; *d*, the arch or hollow ring that surrounds it; *e e*, orifices in this ring to admit the removal of the core after the casting has been made; *a*, the rim, and *b* the single plate connecting it with the ring or arch. The two plates, starting from near the ends of the hub and meeting about midway between it and the rim, constitute a kind of brace to resist the lateral strain upon the wheel. Their curved form, also, as represented in the drawings, is best adapted to yield to the contraction of the metal after the setting of the rim in the process of casting.

I have made the single plate *b* in the form of a succession of radial waves, passing entirely around by a series of curves, from one edge of the rim to the other, to give a continuous support to the whole width of the rim and provide for the contraction of the plate in the direction of the circumference of the wheel. This form also admits the flowing in of the metal to the rim, without disturbing that which has preceeded it, and which has set against the chill. Other forms, however, for this plate, as well as for the two plates constituting the ring, may be substituted without destroying the essential features of the wheel.

The place of greatest strain in railroad-car wheels, as well as in those for common roads, is at or near the hub, and that part should have greater strength of structure than those nearer to the rim. Two plates, therefore, rising from the hub and extending part of the way, and a single plate for the remainder properly apportions the material to the strength required; and my wheel really possesses as much, indeed greater, power to withstand lateral shocks than it would have if the two plates extended all the way to the rim. The short and bracing form moreover of the plates effectually destroys the vibrations and tremor found in those which extend over the whole side of the wheel.

What I claim as my invention, and desire to secure by Letters Patent, is—

The constructing of the rim of the wheel with the hub in cast-iron car-wheels by means of two curved plates starting from near the ends of the hub and joining at a part of the distance between it and the rim, thus forming a hollow ring or arch around the hub, and joining said ring with the rim by a single plate or its equivalent, for the uses and purposes above set forth.

ANSON ATWOOD.

Witnesses:
JOHN STANLEY,
L. R. LASELLE.